UNITED STATES PATENT OFFICE.

HENRY NAPIER AND JOHN J. HOLLINS, OF ELIZABETH, NEW JERSEY.

IMPROVEMENT IN THE MANUFACTURE OF GLASS.

Specification forming part of Letters Patent No. 51,343, dated December 5, 1865.

*To all whom it may concern:*

Be it known that we, HENRY NAPIER and JOHN J. HOLLINS, of Elizabeth, in the county of Union and State of New Jersey, have invented a new and useful Improvement in the Manufacture of Vitreous Substances; and we do hereby declare that the following is a full, clear, and exact description of the same.

This invention consists in substituting for the carbonates of soda or potash hitherto used in what is technically known as the "batch," the nitrates of soda or potash, or, in other words, in the use of such nitrates as the main source of the alkaline base in the manufacture of glass or vitreous substances.

In carrying out our process we take silica in any desired form, either as simple silica (sand, quartz, &c.,) or as a silicate, such as feldspar, in which selica is the predominating element, and use it in combination with salts of potash or soda, either or both, in such qualities and proportions as are found suitable for the composition of glass or enamel of any desired grade. The alkaline salts which we employ are the nitrates of soda or of potash, either separately or conjointly, and we recover the nitric acid, either entirely or in part, in the manner hereinafter described. These salts are employed in such proportions as may suit the manufacture, and they take the place of carbonate of soda and potash, forming the main source of the alkali necessary for vitrification. With carbonate of soda and potash it is exceedingly difficult to obtain them in a state of sufficient purity and regular strength to insure uniform results, and in most cases the cost and trouble attending their purification is such as to cause glass-makers to prefer making a common or very inferior glass to the producing of a good and pure article, which would preclude the necessity of importing foreign ware to meet the requirements of the trade. By the use of the nitrates as the main source of the alkaline base this troublesome purification is rendered unnessary, and by the recovering of the nitric acid the expense caused by their employment is reduced below that of the imported or native carbonate alkaline salts above referred to.

In order to recover the nitric acid we put the mixed materials technically known as "batch," (in which, however, nitrates of soda or potash are substituted for the carbonates generally employed,) into the usual glass-pots of the flint-glass furnace attaching to these latter tubes or pipes of earthenware, or other suitable material for the purpose of conveying the liberated nitreous gases into chambers or receivers for condensation, either as nitric acid or into vessels containing an alkaline solution, in which said gases can be absorbed, forming nitrates, such as nitrates of soda or potash.

We are aware that the nitrates of soda and of potash have been and now are used by glass-makers in very small quantities as purifying agents, but they have not been employed heretofore, as far as we know, as the main source for the base of the vitreous product, their cost precluding their extensive use in the absence of the method of recovering their acids as above stated.

What we claim as new, and desire to secure by Letters Patent, is—

1. Substituting in the manufacture of glass or vitreous substances for the carbonates of soda or potash generally used as sources of the alkalies nitrates of soda or potash, or of other alkalies, substantially as and for the purpose set forth.

2. Recovering, in the manufacture of glass where nitrates are used, the nitric acid evolved during the process by means substantially such as herein described, or any other equivalent means.

The above specification of our invention signed by us this 27th day of September, 1865.

HENRY NAPIER.
JOHN J. HOLLINS.

Witnesses:
M. M. LIVINGSTON,
C. L. TOPLIFF.